United States Patent US 8,964,110 B2
Ono  Feb. 24, 2015

(54) IMAGING APPARATUS

(71) Applicant: Fujifilm Corporation, Tokyo (JP)

(72) Inventor: Shuji Ono, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/291,452

(22) Filed: May 30, 2014

(65) Prior Publication Data

US 2014/0267825 A1  Sep. 18, 2014

Related U.S. Application Data

(63) Continuation of application No. PCT/JP2012/079901, filed on Nov. 19, 2012.

(30) Foreign Application Priority Data

Nov. 30, 2011 (JP) .................. 2011-262597

(51) Int. Cl.
*H04N 5/222* (2006.01)
*H04N 5/225* (2006.01)
*H04N 9/47* (2006.01)
*G03B 13/00* (2006.01)
(Continued)

(52) U.S. Cl.
CPC .......... *H04N 5/2354* (2013.01); *G02B 23/2461* (2013.01); *H04N 2005/2255* (2013.01)
USPC ............. 348/370; 348/65; 348/349; 348/340; 600/160

(58) Field of Classification Search
USPC ................ 348/65, 222.1, 335, 340, 345, 349, 348/364–366, 370, 371, 375, 376; 600/101–183
See application file for complete search history.

(56) References Cited

U.S. PATENT DOCUMENTS 4,902,115 A * 2/1990 Takahashi ............... 359/362
7,221,399 B2 * 5/2007 Fujita et al. .............. 348/340
(Continued)

FOREIGN PATENT DOCUMENTS

JP  63-078119   4/1988
JP  04-346311   12/1992
(Continued)

OTHER PUBLICATIONS

International Search Report, PCT/JP2012/079901, Feb. 26, 2013.
(Continued)

*Primary Examiner* — Sinh Tran
*Assistant Examiner* — Mark Monk
(74) *Attorney, Agent, or Firm* — Young & Thompson

(57) ABSTRACT

In the imaging apparatus according to an aspect of the present invention, the aperture area ratio between the plurality of regions of the multifocal lens is appropriately configured. Thereby, it is configured such that, when a plurality of images are simultaneously imaged via the plurality of regions using the illumination light source, brightness of the image of the subject at an in-focus distance corresponding to one region of the plurality of regions, the image imaged via the one region, the brightness arising from the illumination light, is substantially equal to brightness of the image of another subject at an in-focus body distance corresponding to another region, the image imaged via the other region except the one region, the brightness arising from the illumination light. Accordingly, the subject at any of the distances does not suffer excess or deficient exposure.

20 Claims, 14 Drawing Sheets

(51) Int. Cl.
*A61B 1/06* (2006.01)
*H04N 5/235* (2006.01)
*G02B 23/24* (2006.01)

(56) References Cited

U.S. PATENT DOCUMENTS

2002/0048172 A1    4/2002  Wada et al.
2003/0234867 A1*  12/2003  Fujita et al. ................. 348/207.1
2007/0279618 A1*  12/2007  Sano et al. ...................... 356/72

FOREIGN PATENT DOCUMENTS

| | | |
|---|---|---|
| JP | 11-260144 | 9/1999 |
| JP | 2003-270526 | 9/2003 |
| JP | 2005-109622 | 4/2005 |

OTHER PUBLICATIONS

International Preliminary Report on Patentability, PCT/IPEA/409.

* cited by examiner

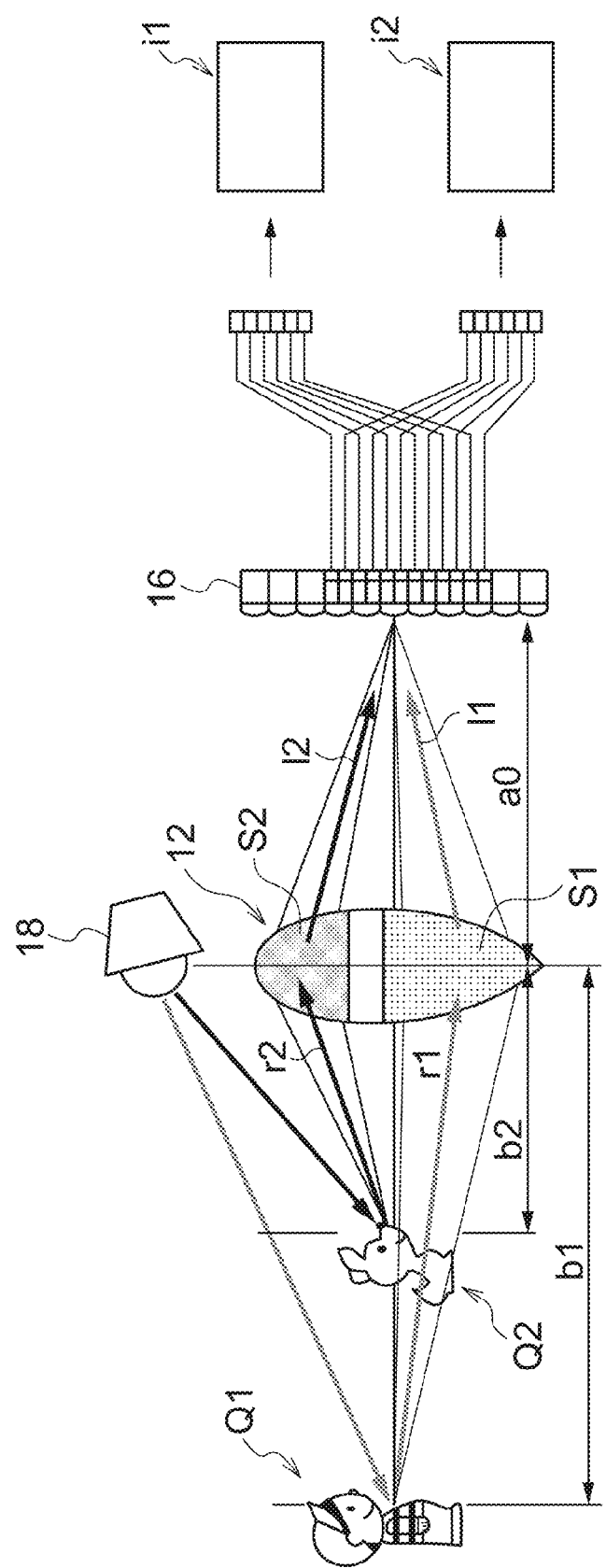

IMAGING APPARATUS

CROSS-REFERENCE TO RELATED APPLICATIONS

This application is a Continuation of PCT International Application No. PCT/JP2012079901 filed on Nov. 19, 2012, which claims priority under 35 U.S.C. §119(a) to Japanese Patent Application No. 2011-262597 filed on Nov. 30, 2011. Each of the above applications is hereby expressly incorporated by reference, in its entirety, into the present application.

BACKGROUND OF THE INVENTION

1. Field of the Invention

The present invention relates to an imaging apparatus, and specifically, relates to an imaging apparatus including a multifocal lens having a plurality of focal distances.

2. Description of the Related Art

Recent years, imaging apparatuses have been known each of which includes a multifocal lens having a plurality of focal distances. For example, PTL 1 discloses an imaging optical system using a multifocal lens which system secures the depth of focus by setting a focal distance ratio or an incident pupil area ratio between the inner region and the outer region within a predetermined range, this enabling image capturing to be performed simultaneously for object points large in difference between their object point distances without employing any movable part. Moreover, PTL 2 discloses an endoscope optical system using a lens with a plurality of focal points in which system a bright image can be obtained while securing an observation range by changing the shape of opening of the aperture stop.

CITATION LIST

Patent Literature

PTL 1: Japanese Patent Application Laid-Open No. 2003-270526

PTL 2: Japanese Patent Application Laid-Open No. 63-78119

SUMMARY OF THE INVENTION

When an imaging apparatus is caused to perform image capturing with illumination light applied from the vicinity of the lens, the farther the distance down to the subject becomes, the more the amount of the light applied to the subject attenuates. As a result, the subject close to the lens tends to suffer overexposure, and conversely, the subject distant from the lens tends to suffer underexposure. This phenomenon causes the significant problem against a strobe light of an ordinary camera, a light guide illumination device of an endoscope, an auxiliary light device (including infrared one) of a monitoring or in-car camera, and the like in many fields. Such a problem also applies to the imaging apparatus that uses the multifocal lens.

For example, although an object of PTL 1 above is to secure the depth of focus for enabling image capturing to be performed simultaneously for object points large in difference between their object point distances, the subjects different in distance undergo constant exposure in PTL 1. Hence, when the intensity of the illumination light is adjusted to the subject at one of the distances in imaging using the illumination light, the subject at the other of the distances suffers over- or underexposure. In order to solve such overexposure or underexposure, as in PTL 2, it can be considered that the aperture stop is changed or that the intensity of the illumination light and/or the sensor gain are switched sequentially for the image capturing. However, such sequential image capturing does not realize simultaneous image capturing, for the plurality of subjects, which, in addition, requires complex switching control. Furthermore, this still causes a problem that response of the control is poor with respect to change in image capturing conditions such as change in distances down to the subjects.

The present invention is devised under such circumstances, and an object thereof is to enable an in-focus image at proper exposure readily to be obtained when image capturing is performed using an imaging apparatus which uses a multifocal lens under illumination light.

In order to achieve the above-mentioned object, an imaging apparatus according to a first aspect of the present invention includes: a multifocal lens having a plurality of regions, the plurality of regions having respective different focal distances; an imaging element having a plurality of light receiving sensors provided corresponding to the plurality of regions, the plurality of light receiving sensors selectively receiving respective light beams each of which has passed through any of the plurality of regions; and an illumination light source that irradiates a subject with illumination light, wherein an aperture area ratio between the plurality of regions is configured such that, when a plurality of images are simultaneously imaged via the plurality of regions using the illumination light source, brightness of the image of the subject at an in-focus distance of one region of the plurality of regions, the image imaged via the one region, the brightness arising from the illumination light, is substantially equal to brightness of the image of another subject at an in-focus distance of another region, the image captured via the other region except the one region, the brightness arising from the illumination light.

In the imaging apparatus according to the first aspect, the aperture area ratio between the plurality of regions of the multifocal lens is appropriately configured. Thereby, it is configured such that, when a plurality of images are simultaneously imaged via the plurality of regions using the illumination light source, brightness of the image of the subject at an in-focus distance corresponding to one region of the plurality of regions, the image imaged via the one region, the brightness arising from the illumination light, is substantially equal to brightness of the image of another subject at an in-focus body distance corresponding to another region, the image imaged via the other region except the one region, the brightness arising from the illumination light. Accordingly, the subject at any of the distances does not suffer excess or deficient exposure. Moreover, images are not needed to be captured a plurality of times, switching the image capturing conditions (illumination light intensity, lens aperture stop and the like) in accordance with the subject distance. Or a plurality of processing systems are not needed beforehand to be provided, the systems having different characteristics (light collecting power, sensitivity and the like of light receiving sensors). Therefore, an in-focus image at proper exposure can be readily obtained.

Notably, in the first aspect and aspects mentioned later, the "multifocal lens" is not limited to one lens but is also considered to include a lens group constituted of a plurality of lenses. Moreover, a "corresponding in-focus distance (to each region of the multifocal lens)" is a distance down to the in-focus position based on the focal distance of each region, specifically meaning $b_i$ and $b_j$ mentioned later.

The imaging apparatus according to a second aspect of the present invention in the first aspect is provided, wherein the aperture area ratio is configured such that the aperture area is wider in a region longer in in-focus distance. This is because it is taken into account that the longer the distance is, to the more an extent the light attenuates.

The imaging apparatus according to a third aspect of the present invention in the first or second aspect, wherein the aperture area ratio is configured to satisfy the following expression:

{Expression 1}

$$\frac{S_i}{S_j} = \frac{b_i^2}{b_j^2} \quad (i, j = 1 \sim N, i \neq j) \quad (1)$$

where

N: The number of regions of the multifocal lens (integer of two or more)

$S_i$ and $S_j$: Aperture areas of regions i and j $b_i$ and $b_j$: In-focus distances corresponding to the regions i and j.

According to the third aspect, the aperture area ratio is defined for making the brightnesses of the images of the subjects at the in-focus distances corresponding to the individual focal regions (in-focus subjects with respect to the individual focal regions) substantially equal to each other when the light collecting powers and sensitivities of the light receiving elements for the individual regions of the multifocal lens are substantially equivalent to each other. By configuring the aperture area ratio as above, any of the subjects does not suffer over- or underexposure. Moreover, the image capturing is not needed to be performed a plurality of times, switching the image capturing conditions (illumination light intensity, aperture stop of the lens, and the like) in accordance with the subject distances. Therefore, an in-focus image at proper exposure can be readily obtained.

The imaging apparatus according to a fourth aspect of the present invention in the first or second aspect is provided, wherein the aperture area ratio is configured to satisfy the following expression:

{Expression 2}

$$\frac{S_i}{S_j} = m_{ij} \times \frac{b_i^2}{b_j^2} \quad (i, j = 1 \sim N, i \neq j) \quad (2)$$

where

N: The number of regions of the multifocal lens $S_i$ and $S_j$: Aperture areas of the regions i and j $b_i$ and $b_j$: In-focus distances corresponding to the regions i and j $m_{ij}$: Received Light intensity (li) of the light receiving sensor corresponding to the region i/received light intensity (lj) of the light receiving sensor corresponding to the region j.

According to the fourth aspect, the aperture area ratio is defined for making the brightnesses of the images of the subjects at the in-focus distances corresponding to the individual focal regions (in-focus subjects with respect to the individual focal regions) substantially equal to each other when the light collecting powers and sensitivities of the light receiving sensors being different for the individual regions. Notably, the difference in light collecting power and sensitivity is caused by the dimensions of the light receiving sensors, the presence or absence of light collecting microlenses in the light receiving sensors, the difference in output signal level at the same light amount between those, and the like. By configuring the aperture area ratio as above, any of the subjects does not suffer over- or underexposure. Moreover, the image capturing is not needed to be performed a plurality of times, switching the image capturing conditions (illumination light intensity, aperture stop of the lens, and the like) in accordance with the subject distances. Therefore, an in-focus image at proper exposure can be readily obtained.

An imaging method according to a fifth aspect of the present invention in any of the first to fourth aspects is provided, wherein the plurality of light receiving sensors are configured to satisfy the following expression:

{Expression 3}

$$\frac{P_i}{P_j} = \frac{S_i}{S_j} \quad (i, j = 1 \sim N, i \neq j) \quad (3)$$

where

N: The number of regions of the multifocal lens $P_i$ and $P_j$: The numbers of light receiving sensors corresponding to the regions i and j $S_i$ and $S_j$: Aperture areas of the regions i and j.

According to the fifth aspect, the ratio of the numbers of sensors corresponding to the individual regions of the multifocal lens is configured to be equal to the ratio of the aperture areas of the individual regions.

As described above, according to the present invention, when image capturing is performed using an imaging apparatus which uses a multifocal lens under illumination light, an in-focus image at proper exposure can be readily obtained.

BRIEF DESCRIPTION OF THE DRAWINGS

FIG. 9 is a diagram illustrating a situation of configuring an aperture area ratio of the image capturing lens 12.

DETAILED DESCRIPTION OF THE EMBODIMENTS

Hereafter, embodiments for implementing an imaging apparatus according to the present invention are described in accordance with the appended drawings.

[First Embodiment]

<Configuration of Imaging Apparatus>

Figure 1:
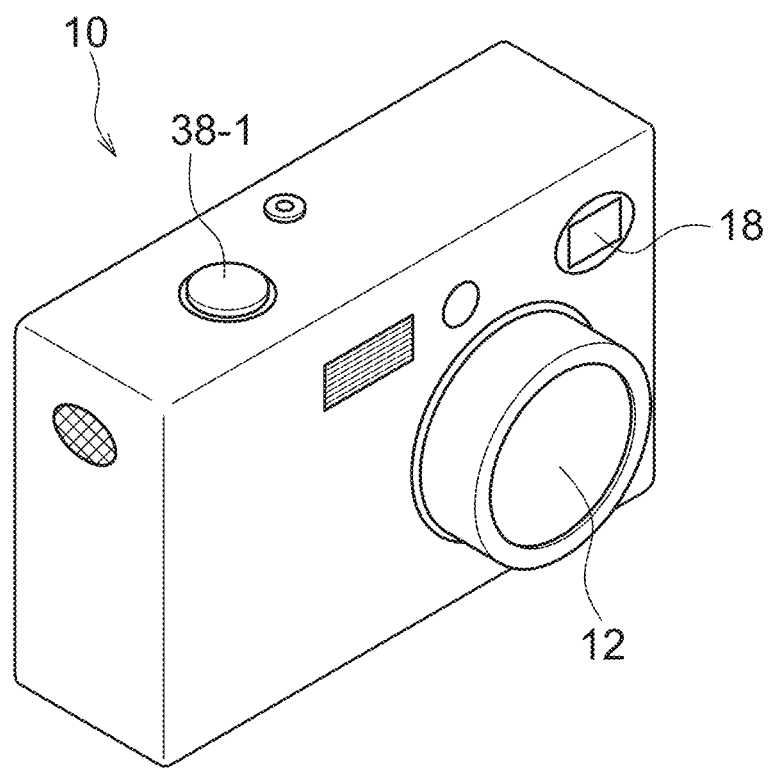
FIG. 1 is a perspective view illustrating appearance of an imaging apparatus 10 according to a first embodiment of the present invention.

FIG. 1 is a perspective view illustrating appearance of an imaging apparatus 10 (imaging apparatus) according to a first embodiment of the present invention. The imaging apparatus 10 includes an image capturing lens 12. On its front face, a strobe light 18 as an illumination light source (illumination light source), and on its top face, a shutter button 38-1 are provided.

Figure 2:
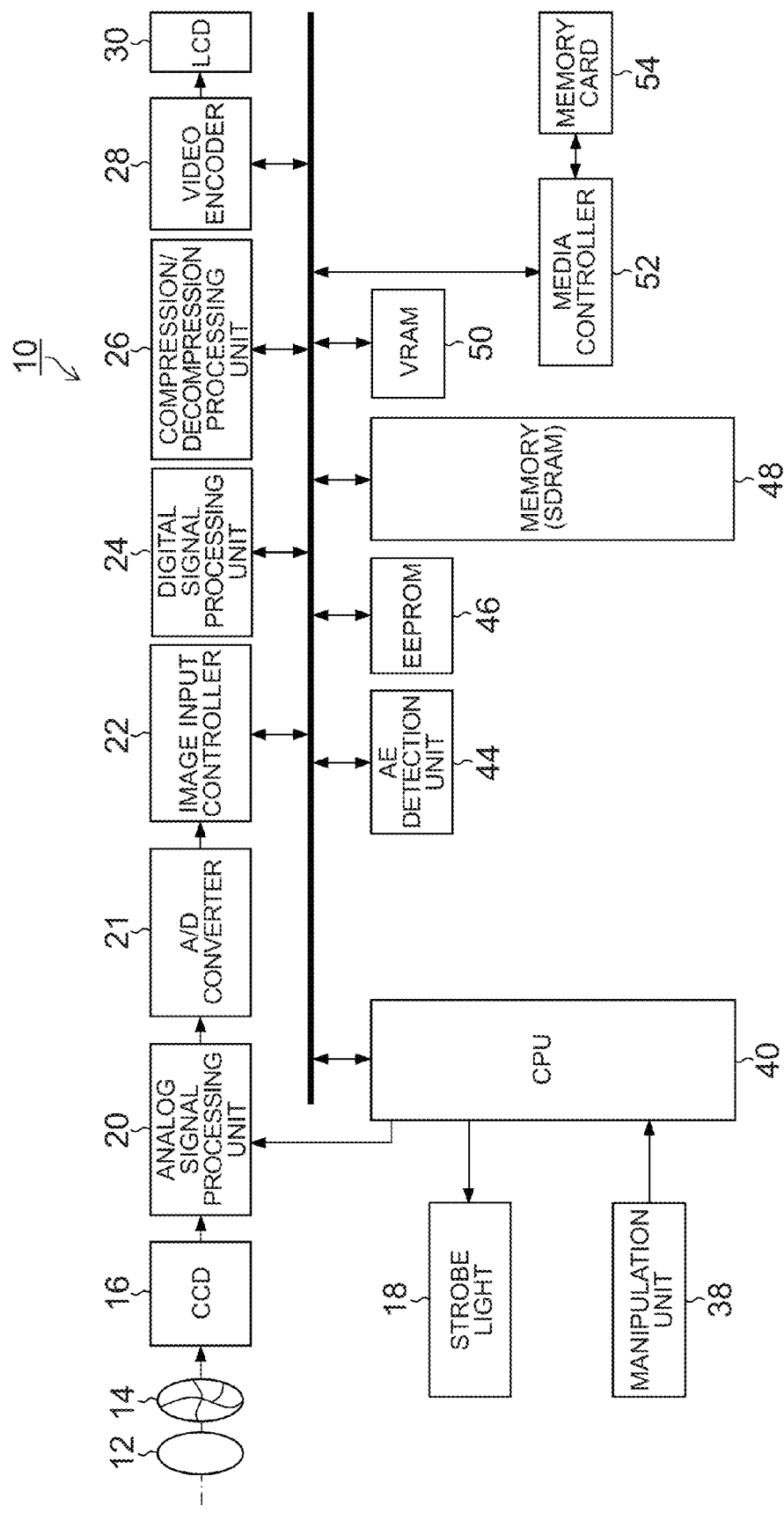
FIG. 2 is a block diagram illustrating a configuration of the imaging apparatus 10.

FIG. 2 is a block diagram illustrating an overview of a configuration of the imaging apparatus 10. Operation of the whole device of the imaging apparatus 10 is integrally controlled by a central processing unit (CPU) 40. Programs and parameters required for the operation of the CPU 40 are stored in an EEPROM (Electronically Erasable and Programmable Read Only Memory) 46.

In the imaging apparatus 10, a manipulation unit 38 is provided to include, as well as a shutter button 38-1, a mode dial, a playback button, a MENU/OK key, a cross key, a BACK key and the like. The user manipulates the buttons and keys included in the manipulation unit 38, so that he/she can instruct selection of image capturing and/or playing-back modes, starting of image capturing, selection, playing-back or deletion of images, or the like. Signals from the manipulation unit 38 are inputted to the CPU 40. The CPU 40 controls circuits in the imaging apparatus 10 on the basis of the input signals.

Figure 3:
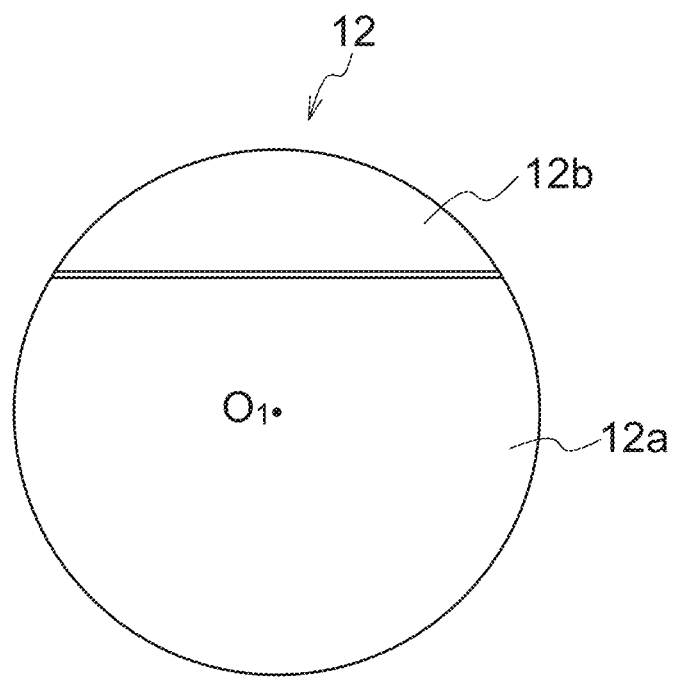
FIG. 3 is an elevation view illustrating an image capturing lens 12.

In the image capturing mode, light from the subject is imaged on a light receiving plane of a solid-state imaging element (hereinafter referred to as "CCD") 16 via an image capturing lens 12 (multifocal lens) and an aperture stop 14. The image capturing lens 12 is a multifocal lens (dual-focus lens) which has a region 12a having a longer focal distance (hereinafter referred to as far focal region) and a region 12b having a shorter focal length than the far focal region (hereinafter referred to as near focal region). An aperture area ratio between the far focal region 12a and the near focal region 12b is optimized as mentioned later. As illustrated in FIG. 3, the image capturing lens 12 is provided with semicircular regions in the vertical direction of the lens as seen from the front. These are the far focal region 12a and the near focal region 12b in the order from the bottom. In the present embodiment, the far focal region 12a which has the maximum aperture area and includes a lens center $O_1$ is the primary region.

Figure 4:
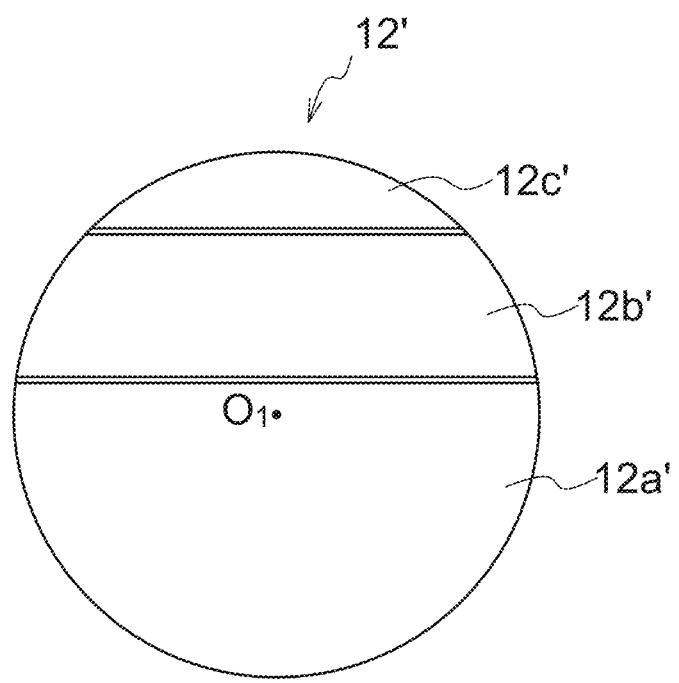
FIG. 4 is an elevation view illustrating another example of the image capturing lens.
Figure 5A:
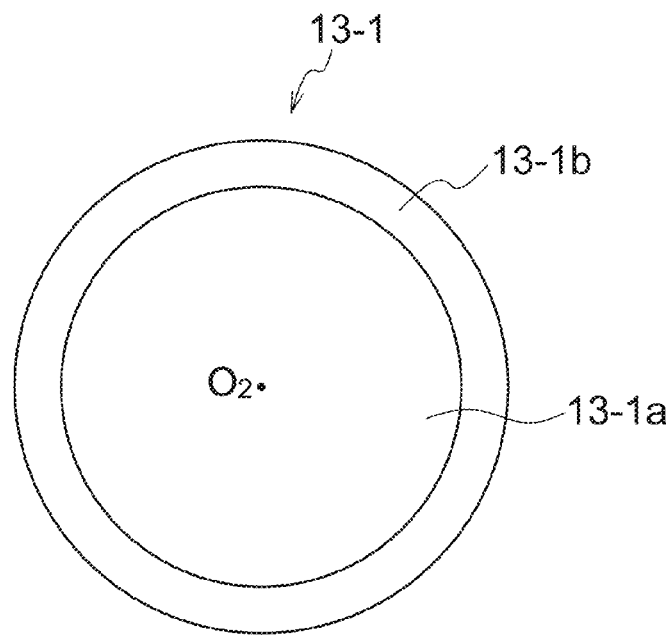
FIG. 5A is an elevation view illustrating still another example of the image capturing lens.
Figure 5B:
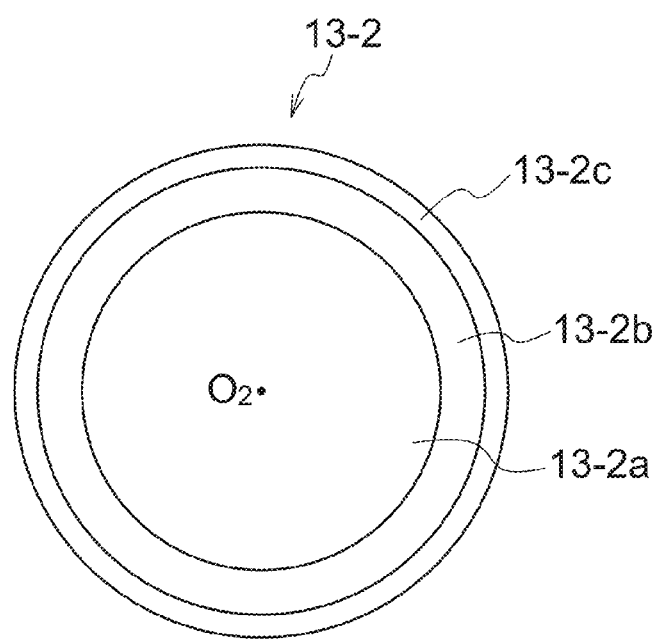
FIG. 5B is an elevation view illustrating still another example of the image capturing lens.

Notably, the number of focal regions in the multifocal lens is not limited to two, but as in an image capturing lens 12' illustrated in an example of FIG. 4, it may be constituted of three focal regions 12a', 12b' and 12c'. Moreover, while, in the examples of FIG. 3 and FIG. 4, each of the focal regions is formed to be semicircular or belt-shaped, as in image capturing lenses 13-1 and 13-2 illustrated in FIG. 5A and FIG. 5B, they may be formed of circular regions including lens centers $O_2$ (far focal regions 13-1a and 13-2a) and annular regions in their circumferences (near/medium focal regions 13-1b, 13-2b and 13-2c). In these regions, specific values of their focal distances may be configured so as to match the purpose of image capturing.

Figure 6:
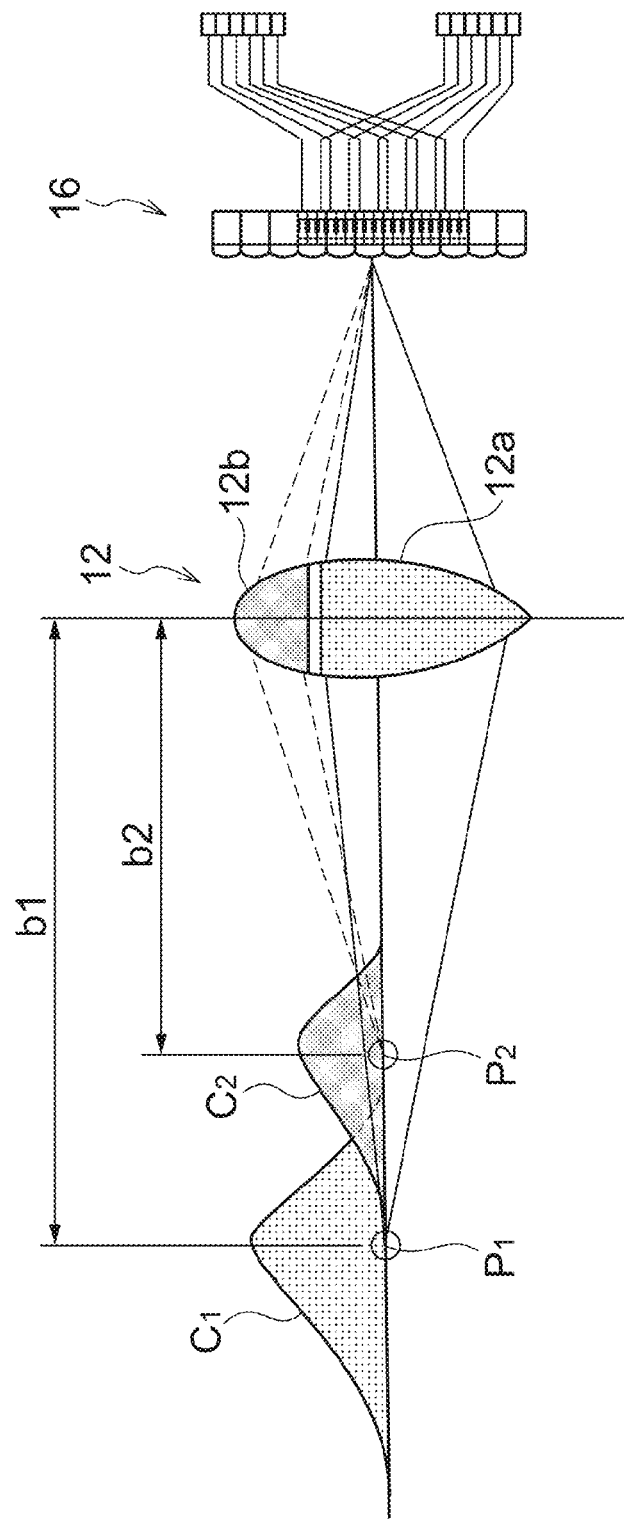
FIG. 6 is a conceptual diagram illustrating relationship between a subject distance and a focusing degree with respect to the image capturing lens 12.

FIG. 6 is a conceptual diagram illustrating relationship between a subject distance and a focusing degree in the image capturing lens 12. In FIG. 6, focusing degree curves $C_1$ and $C_2$ are curves representing focusing degrees in the far focal region 12a and the near focal region 12b. Distances down to points $P_1$ and $P_2$ where the curves have their peaks correspond to in-focus positions $b_1$ and $b_2$ of the regions of the image capturing lens 12. Moreover, the heights of the curves correspond to the focusing degrees and the distributions of the curves correspond to the depths of field. Accordingly, a subject at the position (distance $b_1$) corresponding to $P_1$ precisely comes in focus with the far focal region 12a and a subject at the position (distance $b_2$) corresponding to $P_2$ precisely comes in focus with the near focal region 12b. On the other hand, when the subjects are in the distributions of the curves $C_1$ and $C_2$, they come in focus to some extent (suffers blur to some extent) with the individual regions in accordance with displacements from $P_1$ and $P_2$.

Each of the areas of regions which are enclosed by the curves corresponds to each of the areas of the focal regions. The shape of each curve and its overlapping with the other curve may be configured in accordance with the characteristics of the optical system and the purpose of image capturing. Notably, the curves $C_1$ and $C_2$ correspond to the MTF (Modulation Transfer Function) curves for the respective regions.

Figure 8:
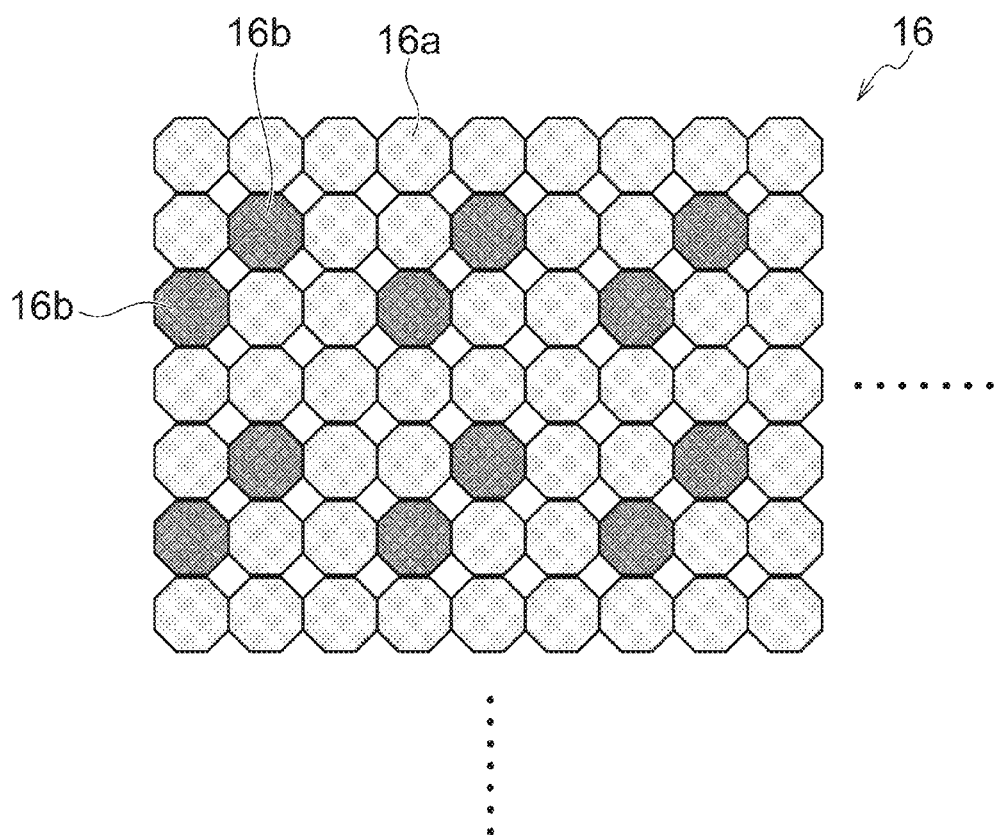
FIG. 8 is a diagram illustrating an arrangement of light receiving elements in the CCD 16.

Light beams having passed through the far focal region 12a and the near focal region 12b of the image capturing lens 12 are incident on light receiving cells of the CCD 16 (imaging element). As illustrated in FIG. 8, the CCD 16 has light receiving cells 16a for distant imagery (light receiving sensors) that receive the light beam having passed through the far focal region 12a of the image capturing lens 12 and light receiving cells 16b for close imagery (light receiving sensors) that receive the light beam having passed through the near focal region 12b thereof. The light receiving cells 16a and 16b are configured selectively to receive the respective light beams having passed through the far focal region 12a and the near focal region 12b, with microlenses ML and light shielding films 18a and 18b which are provided on the front faces of light receiving units 17. Hence, the light shielding films 18a and 18b have different shapes from each other. Notably, instead of providing the light shielding film on the front face of the light receiving unit 17, a light shielding member may be provided on the front face of the microlens ML.

Notably, as illustrated in FIG. 8, the numbers of the light receiving cells constitute a ratio according to the aperture areas of the corresponding lens regions. In the present embodiment, the element number of the light receiving cells 16a for distant imagery corresponding to the far focal region 12a is more than that of the light receiving cells 16b for close imagery. In the present embodiment, an image obtained from the light receiving cells 16a for distant imagery is the primary image. By making the light receiving cells 16a for distant imagery more in accordance with the area ratio of the image capturing lens, the primary image in high image quality can be obtained. Notably, the numbers of the light receiving cells may be configured to be equal to the aperture area ratio of the focal regions corresponding to the light receiving cells. The light receiving cells are preferable to be arranged not to cause deterioration of the image quality in a specific region or direction in the obtained image. Deficiency in the pixel data caused by having the cells corresponding to the respective plurality of focal regions mixed is preferable to be properly complemented by interpolation or the like.

When the shutter button 38-1 is at first stage pressing (half push), the CPU 40 starts AE operation and image data outputted from an AD converter 21 is taken into an AE detection unit 44. The CPU 40 calculates brightness of the subject (image capturing Ev value) from the integration value of G-signals inputted in the AE detection unit 44. Based on the result, it performs control of the aperture value of the aperture stop 14, the charge storage time in the CCD 16, the light-emitting time of the strobe light 18 and the like.

When the AE operation is finished and the shutter button is at second stage pressing (full push), the strobe light 18 emits light for the predetermined time. Moreover, based on readout signals applied from a CCD controller 32, signal charges stored in the CCD 16 are read out as voltage signals in accordance with the signal charges to be applied to an analog signal processing unit 20. With respect to the voltage signals outputted from the CCD 16, the analog signal processing unit 20 samples and holds R, G and B signals of pixels by the correlated double sampling processing and amplifies them, which are applied to the AD converter 21 after that. The AD converter 21 converts the R, G and B signals which are analog and being sequentially inputted into digital R, G and B signals to output them to an image input controller 22.

Image data outputted from the image input controller 22 is inputted in a digital signal processing unit 24 and undergoes predetermined signal processing of gain control processing, gamma correction processing, YC processing and the like including offset processing, white balance correction and sensitivity correction. It is written and read out in/from a VRAM 50, and after that, encoded by a video encoder 28 to be outputted to a liquid crystal monitor 30. Thereby, the subject image is displayed on the liquid crystal monitor 30.

Moreover, the image data outputted from the AD converter 21 in response to the full push of the shutter button is inputted in a memory (SDRAM) 48 from the image input controller 22 to be stored temporarily. After it is temporarily stored in the memory 48, it undergoes the predetermined signal processing of the gain control processing, the gamma correction processing, the YC processing and the like in the digital signal processing unit 24, and undergoes compression processing into the JPEG (joint photographic experts group) format and the like in a compression/decompression processing unit 26 to afford an image file. The image file is read out by a media controller 52 to be recorded in a memory card 54. The image recorded in the memory card 54 can be played back and displayed on the liquid crystal monitor 30 by manipulating the playback button of the manipulation unit 38.

[Optimization of Aperture Area Ratio]

Next, optimization of the aperture area ratio of the image capturing lens 12 in the imaging apparatus 10 is described.

FIG. 9 is a conceptual diagram illustrating a situation of image capturing using the imaging apparatus 10. In FIG. 9, the contents of the reference signs are as follows.

$a_0$: Distance between the image capturing lens 12 and the CCD 16

$b_1$ and $b_2$: In-focus distances of the regions 1 and 2 (distances down to the subjects $Q_1$ and $Q_2$)

$r_1$ and $r_2$: Attenuation rates of illumination light of the strobe light 18 returned to the lens side after the illumination light reaches and is reflected by the subjects $Q_1$ and $Q_2$ $S_1$ and $S_2$: Aperture areas of the regions 1 and 2 of the image capturing lens 12

$i_1$ and $i_2$: Images acquired with the regions 1 and 2

$l_1$ and $l_2$: Intensities of light received by the light receiving elements of the CCD 16 for the output images $i_1$ and $i_2$ (for the regions 1 and 2) (received light intensities)

Under these circumstances, based on the formula of imaging, expressions (1-1) and (1-2) below are completed. Notably, $f_1$ and $f_2$ are the focal distances of the regions 1 and 2.

{Expression 4}

$$\frac{1}{f_1} = \frac{1}{a_0} + \frac{1}{b_1} \tag{1-1}$$

{Expression 5}

$$\frac{1}{f_2} = \frac{1}{a_0} + \frac{1}{b_2} \tag{1-2}$$

Base on expressions (1-1) and (1-2), expressions (1-3) and (1-4) are completed, respectively.

{Expression 6}

$$b_1 = \frac{1}{\frac{1}{f_1} - \frac{1}{a_0}} \tag{1-3}$$

{Expression 7}

$$b_2 = \frac{1}{\frac{1}{f_2} - \frac{1}{a_0}} \tag{1-4}$$

Next, supposing that the attenuation of illumination light is only caused by spread of the illumination light, not caused by absorption of the light with air, the attenuation rates $r_1$ and $r_2$ are inversely proportional to the squares of the distances $b_1$ and $b_2$ from the strobe light 18 to the subjects. Therefore, the ratio between $r_1$ and $r_2$ is expressed as:

{Expression 8}

$$\frac{r_2}{r_1} = \frac{b_1^2}{b_2^2} \tag{1-5}$$

Notably, since the strobe light 18 is in the vicinity of the image capturing lens 12, the distances from the strobe light 18 to the subjects $Q_1$ and $Q_2$ can be regarded as being equal to the distances from the image capturing lens 12 to the subjects $Q_1$ and $Q_2$.

Moreover, the received light intensities $l_1$ and $l_2$ of the light receiving elements of the CCD 16 for the output images $i_1$ and $i_2$ are proportional to the products of the amounts of light that reaches the image capturing lens 12 and the lens aperture areas as follows (proportionality coefficient is k).

{Expression 9}

$$l_1 = k \times r_1 \times S_1 \tag{1-6}$$

{Expression 10}

$$l_2 = k \times r_2 \times S_2 \tag{1-7}$$

When the light collecting powers and sensitivities of the light receiving elements for the output images $i_1$ and $i_2$ are substantially equivalent to each other, in order to make the brightnesses of the images of the in-focus subjects $Q_1$ and $Q_2$ with the focal regions 1 and 2 substantially equal to each other, it is sufficient that the received light intensities $l_1$ and $l_2$ are made even ($l_1/l_2=1.0$). In such a case, based on (1-5) to (1-7), $r_1 \times S_1 = r_2 \times S_2$. Herein, since the attenuation rates $r_1$ and $r_2$ are determined depending on the distances $b_1$ and $b_2$ down to the subjects, $S_1$ and $S_2$ are adjustable. Furthermore, also since, for the total aperture area S of the image capturing lens 12, $S=S_1+S_2$, adjusting the ratio of $S_1$ and $S_2$ enables $l_1$ and $l_2$ to be even eventually, as follows.

{Expression 11}

$$1.0 = \frac{l_1}{l_2} = \frac{k \times r_1 \times S_1}{k \times r_2 \times S_2} \quad (1\text{-}8)$$

Based on this,

{Expression 12}

$$\frac{S_1}{S_2} = \frac{r_2}{r_1} = \frac{b_1^2}{b_2^2} = \frac{\left\{\left(\frac{1}{f_2}\right)-\left(\frac{1}{a_0}\right)\right\}^2}{\left\{\left(\frac{1}{f_1}\right)-\left(\frac{1}{a_0}\right)\right\}^2} \quad (1\text{-}9)$$

Notably, while the case where the number of the regions is two is described in the present embodiment, the relationship of expression (1-9) is completed also for arbitrary two regions in a case where the number of regions of the image capturing lens 12 is three or more. Therefore, when the number of regions is N (integer of two or more), generally:

{Expression 13}

$$\frac{S_i}{S_j} = \frac{b_i^2}{b_j^2} \quad (i, j = 1 \sim N, i \neq j) \quad (1\text{-}10)$$

Notably, in this case, taking account of the total aperture area $S=S_1+S_2+\ldots+S_N$, expression (1-10) can also be represented as follows, setting an arbitrary region g (for example, region 1) as reference.

{Expression 14}

$$\sum_{j=1}^{N}\left\{\left(\frac{b_j^2}{b_g^2}\right) \times S_g\right\} = S \quad (1\text{-}11)$$

where

N: The number of regions of the image capturing lens (integer of two or more)

S: Total aperture area of the image capturing lens $S_g$: Aperture area of the arbitrary region g (any of regions 1 to N)

$S_j$: Aperture area of region j $b_g$: In-focus distance of the region g $b_j$: In-focus distance of the region j Next, images acquired by the imaging apparatus 10 including the image capturing lens 12 for which the aperture area ratio of the far focal region 12a and the near focal region 12b is configured to be a value indicated by expression (1-9) are described.

Figure 10A:
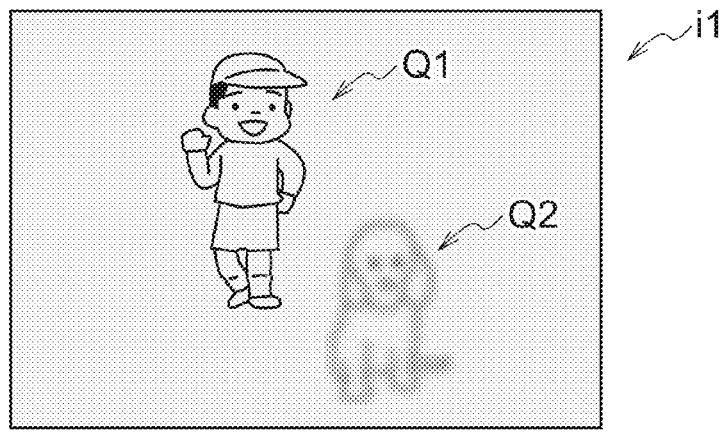
FIG. 10A is a schematic diagram illustrating an example of images acquired with regions of the image capturing lens 12.

FIG. 10A is an example of the image $i_1$ acquired with the far focal region 12a. The relationship between the imaging apparatus 10 and the subject is supposed to be in the case of FIG. 9. As described in the section "Configuration of Imaging Apparatus" above, since the subject $Q_1$ at the distance $b_1$ comes in focus with the far focal region 12a, in the image $i_1$, while the subject $Q_1$ comes in focus, the subject $Q_2$ at the distance $b_2$ closer than the subject $Q_1$ does not come in focus, affording blur in accordance with the difference between the distance $b_1$ and the distance $b_2$. Moreover, while the subject $Q_1$ is at proper exposure in the image $i_1$, the subject $Q_2$ is brighter than the subject $Q_1$ in the image $i_1$, since the subject $Q_2$ is at the distance $b_2$ closer than the subject $Q_1$.

Figure 10B:
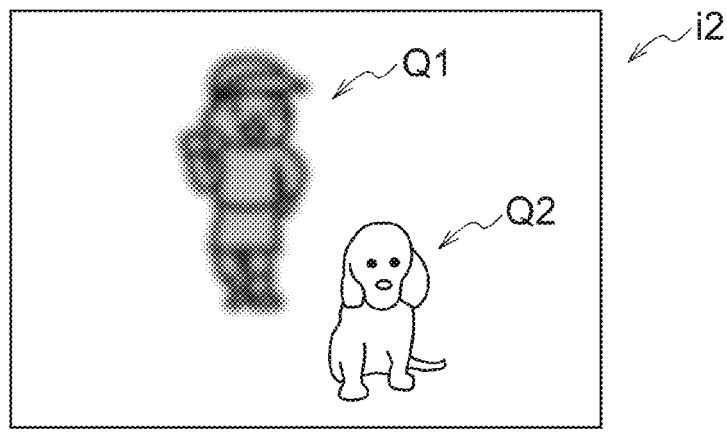
FIG. 10B is a schematic diagram illustrating another example of images acquired with regions of the image capturing lens 12.

On the other hand, FIG. 10B is an example of the image $i_2$ acquired with the near focal region 12b. The relationship between the imaging apparatus 10 and the subject is supposed to be in the case of FIG. 9. As described in the section "Configuration of Imaging Apparatus" above, since the subject $Q_2$ at the distance $b_2$ comes in focus with the near focal region 12b, in the image $i_2$, while the subject $Q_2$ comes in focus, the subject $Q_1$ at the distance $b_1$ more distant than the subject $Q_2$ does not come in focus, affording blur in accordance with the difference between the distance $b_2$ and the distance $b_1$. Moreover, while the subject $Q_2$ is at proper exposure in the image $i_2$, the subject $Q_1$ is darker than the subject $Q_2$ in the image $i_2$, since the subject $Q_1$ is at the distance $b_1$ more distant than the subject $Q_2$.

As above, in the imaging apparatus 10 according to the present invention, the far focal region 12a and the near focal region 12b have the aperture area ratio with the value represented by expression (1-9). Hence, when the images $i_1$ and $i_2$ of the subjects $Q_1$ and $Q_2$ are simultaneously acquired via the far focal region 12a and the near focal region 12b, the brightness of the image of the subject $Q_1$ at the in-focus distance $b_1$ corresponding to the far focal region 12a which image is imaged via the far focal region 12a, the brightness arising from the illumination light of the strobe light 18 is substantially equal to the brightness of the image of the other subject $Q_2$ at the in-focus distance $b_2$ corresponding to the near focal region 12b which image is captured via the near focal region 12b, the brightness arising from the illumination light of the strobe light 18. Accordingly, any of the subjects $Q_1$ and $Q_2$ does not suffer over- or underexposure. Moreover, the image capturing is not needed to be performed a plurality of times, switching the image capturing conditions (illumination light intensity, aperture stop of the lens, and the like) in accordance with the subject distances. Therefore, an in-focus image at proper exposure can be readily obtained.

Notably, $b_1$ and $b_2$ can be configured in accordance with the purpose of image capturing. When $b_1=4$ m, $b_2=1$ m, for example, based on expression (1-9), $S_1/S_2=4^2/1^2=16$.

The acquired images $i_1$ and $i_2$ may be simultaneously displayed on the liquid crystal monitor 30 or only one image of these which is selected by the user may be displayed thereon. Moreover, in the imaging apparatus 10 according to the present invention, the in-focus subject comes at the proper exposure, (conversely, the subject at the proper exposure comes in focus). Hence, a subject of interest (for example, the subject $Q_1$) may be designated by the processing on the imaging apparatus 10 side or the user's manipulation via the manipulation unit 38 or the liquid crystal monitor 30. Thus, the image in which this subject of interest comes at the proper exposure in focus (image $i_1$ in this case) may be selected and displayed.

Figure 10C:
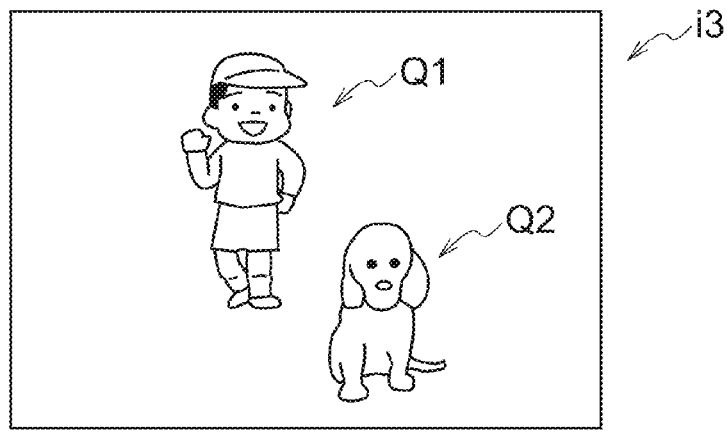
FIG. 10C is a schematic diagram an example of an image having the images combined which images are acquired with the regions of the image capturing lens 12.

Furthermore, as illustrated in an example of FIG. 10C, parts at the proper exposure may be extracted from the images $i_1$ and $i_2$ (subject $Q_1$ and its periphery part in the image $i_1$; subject $Q_2$ and its periphery part in the image $i_2$). Thus, an image $i_3$ having the extracted parts combined may be displayed on the liquid crystal monitor 30 and/or recorded in the memory card 54.

[Second Embodiment]

For a second embodiment, the aperture area ratio between the regions is described for making the brightnesses of the images of the in-focus subjects $Q_1$ and $Q_2$ with the focal regions 1 and 2 substantially equal to each other when the received light intensities of the light receiving elements for the regions of the image capturing lens are not even. Notably, a configuration of an imaging apparatus according to the second embodiment is similar to that of the imaging apparatus 10 according to the first embodiment except the aperture area ratio of the image capturing lens 12. Hence, its elements are provided with the same reference signs as those of the imaging apparatus 10 and their detailed description is omitted.

Also for the second embodiment, supposing the situation in FIG. 9 similarly to the first embodiment, expressions (1-1) to (1-7) above are completed. Herein, supposing that the received light intensities $l_1$ and $l_2$ of the light receiving elements for the output images $i_1$ and $i_2$ are not even ($l_1/l_2=1.0$) but that their ratio ($l_1/l_2$) is $m_{12}$ in the CCD 16, the following relationship is completed.

{Expression 15}

$$m_{12} = \frac{l_1}{l_2} = \frac{k \times r_1 \times S_1}{k \times r_2 \times S_2} \quad (2\text{-}1)$$

Based on this,

{Expression 16}

$$\frac{S_1}{S_2} = m_{12} \times \frac{r_2}{r_1} = m_{12} \times \frac{b_1^2}{b_2^2} = m_{12} \times \frac{\left\{\left(\frac{1}{f_2}\right) - \left(\frac{1}{a_0}\right)\right\}^2}{\left\{\left(\frac{1}{f_1}\right) - \left(\frac{1}{a_0}\right)\right\}^2} \quad (2\text{-}2)$$

Notably, the relationship of expression (2-2) is not limited to the case where the number of regions of the image capturing lens 12 is two but is completed between arbitrary two regions in the case where the number of regions thereof is three or more. Hence, when the number of regions is N (integer of two or more), generally, {Expression 17}

$$\frac{S_i}{S_j} = m_{ij} \times \frac{b_i^2}{b_j^2} (i, j = 1 \sim N, i \neq j) \quad (2\text{-}3)$$

Herein,

{Expression 18}

$$m_{ij} = \frac{l_i}{l_j} = \frac{k \times r_i \times S_i}{k \times r_j \times S_j} (i, j = 1 \sim N, i \neq j) \quad (2\text{-}4)$$

Notably, in this case, taking account of expression (2-3) and the total aperture area $S=S_1+S_2+\ldots+S_N$, expression (2-4) can also be represented as follows, setting an arbitrary region g (for example, region 1) as reference:

{Expression 19}

$$\sum_{j=1}^{N} \left\{ m_{gj} \times \left(\frac{b_j^2}{b_g^2}\right) \times S_g \right\} = S \quad (2\text{-}5)$$

where

N: The number of regions of the image capturing lens (integer of two or more)

$S_g$: Aperture area of the arbitrary region g (any of regions 1 to N)

$S_j$: Aperture area of the region j $b_g$: In-focus distance corresponding to the region g $b_j$: In-focus distance corresponding to the region j $m_{gj}$: Received light intensity ($l_g$) of the light receiving sensor corresponding to the region g/received light intensity ($l_j$) of the light receiving sensor corresponding to the region j As above, in the second embodiment, the far focal region 12a and the near focal region 12b have the aperture area ratio with the value represented by expression (2-2). Hence, when the images $i_1$ and $i_2$ of the subjects $Q_1$ and $Q_2$ are simultaneously acquired via the far focal region 12a and the near focal region 12b, the brightness of the image of the subject $Q_1$ at the in-focus distance $b_1$ corresponding to the far focal region 12a which image is imaged via the far focal region 12a, the brightness arising from the illumination light of the strobe light 18 is substantially equal to the brightness of the image of the other subject $Q_2$ at the in-focus distance $b_2$ corresponding to the near focal region 12b which image is captured via the near focal region 12b, the brightness arising from the illumination light of the strobe light 18. Accordingly, any of the subjects $Q_1$ and $Q_2$ does not suffer over- or under-exposure. Moreover, the image capturing is not needed to be performed a plurality of times, switching the image capturing conditions (illumination light intensity, aperture stop of the lens, and the like) in accordance with the subject distances. Therefore, an in-focus image at proper exposure can be readily obtained.

Notably, in the second embodiment, $b_1$, $b_2$ and $m_{12}$ can be configured in accordance with the purpose of image capturing and the characteristics of the device. When $b_1=3$ m, $b_2=0.5$ m, $m_{12}=0.5$, for example, based on expression (2-2), $S_1/S_2=(3^2/0.5^2)\times0.5=16$. When ($b_1/b_2$) is large, that is, $b_1$ is exceedingly longer compared with $b_2$, the region 2 is exceedingly thinner than the region 1. However, when the light collecting ratio and sensitivity of the light receiving sensor for the region 2 are higher than the light collecting ratio and sensitivity of the light receiving sensor for the region 1 ($m_{12}$ is smaller than 1), the region 2 can be configured not to be exceedingly thinner than the region 1.

Notably, also in the second embodiment similarly to the first embodiment, the image in which the subject of interest is at proper exposure in focus may be selected and displayed or parts in which the subject is at proper exposure in focus may be extracted from the acquired images to be combined and to be displayed.

[Third Embodiment]

Figure 11:
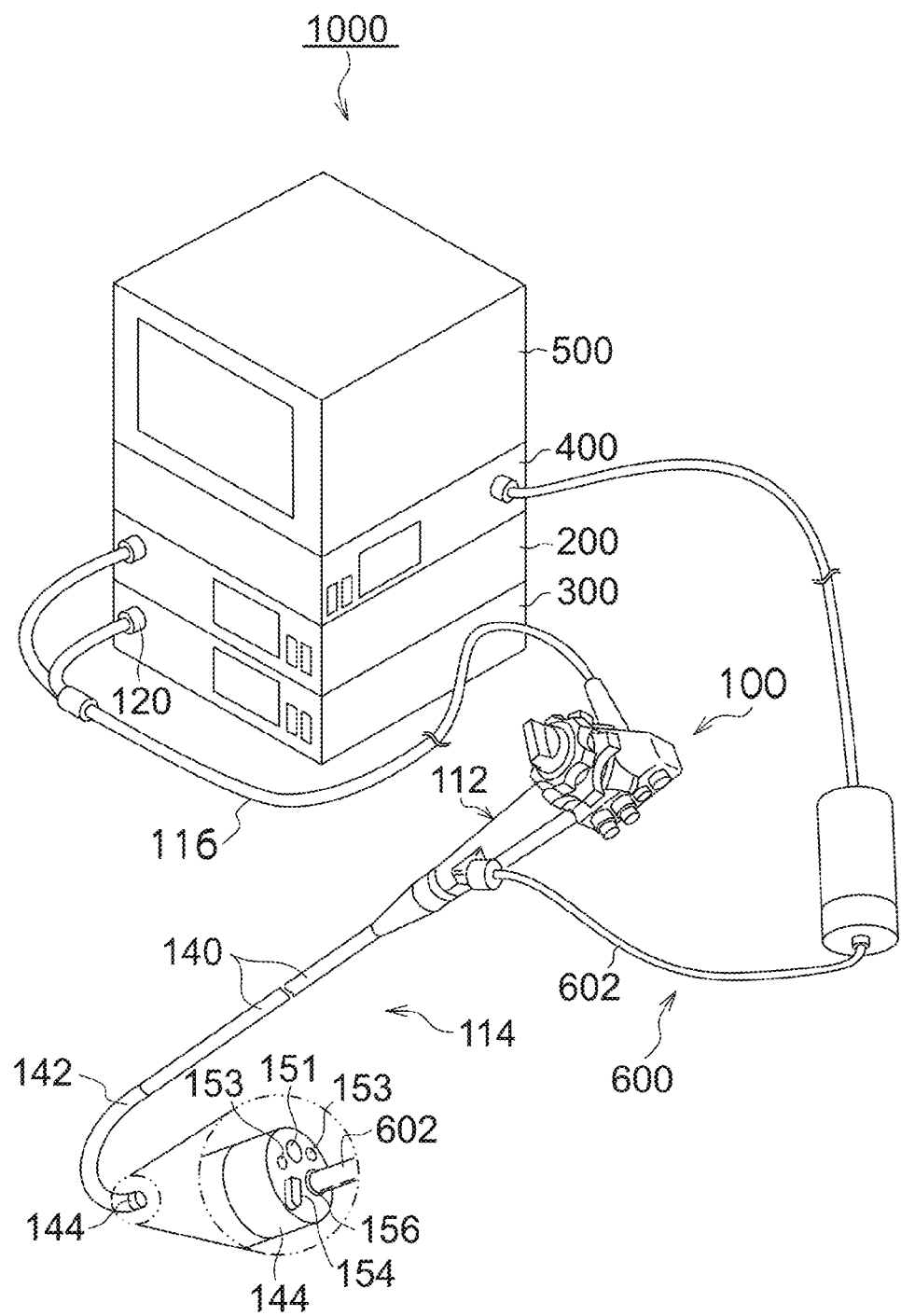
FIG. 11 is an external view illustrating an image diagnosis apparatus 1000 according to a third embodiment of the present invention.
Figure 12:
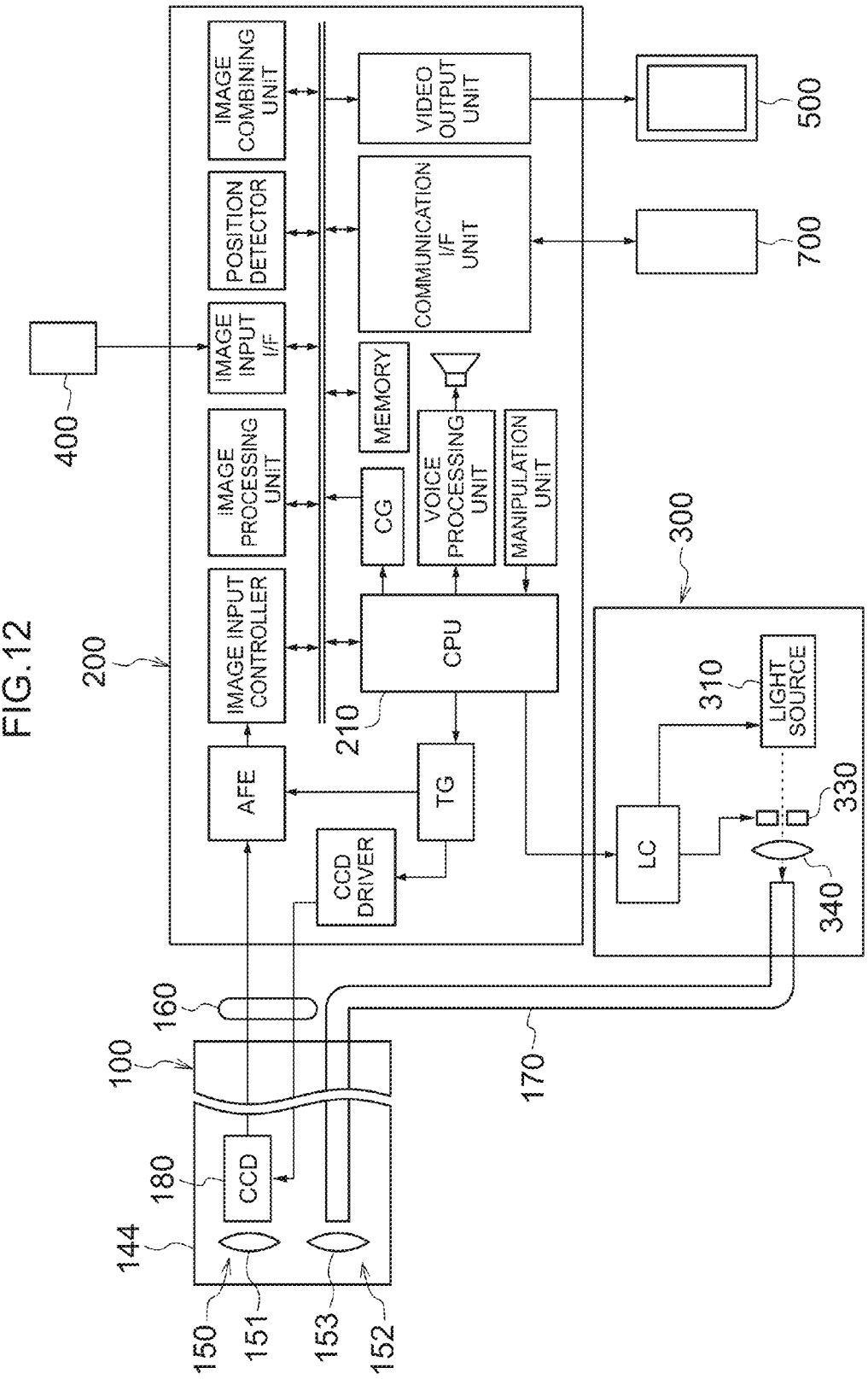
FIG. 12 is a block diagram illustrating a configuration of the essential part of the image diagnosis apparatus 1000.

Next, a second embodiment of the imaging apparatus according to the present invention is described. FIG. 11 is an external view illustrating an image diagnosis apparatus 1000 according to the second embodiment. FIG. 12 is a block diagram illustrating a configuration of the essential part of the image diagnosis apparatus 1000. As illustrated in FIG. 11 and FIG. 12, the image diagnosis apparatus 1000 is mainly constituted of an endoscope 100, an endoscope processor 200, a light source device 300, an OCT processor 400, a monitor device 500 and a server 700.

The endoscope 100 includes a hand operating part 112 and an insertion part 114 provided in connection with the hand operating part 112. The operator holds and manipulates the hand operating part 112 and inserts the insertion part 114 into the body of the person to be diagnosed, performing observation. The insertion part 114 is constituted of a flexible part 140, a bending part 142 and a distal end portion 144 in the order from the hand operating part 112 side. The distal end portion 144 is provided with an observation optical system 150, an illumination optical system 152, an air-supply/water-supply nozzle 154, a forceps exit 156 and the like.

Figure 7:
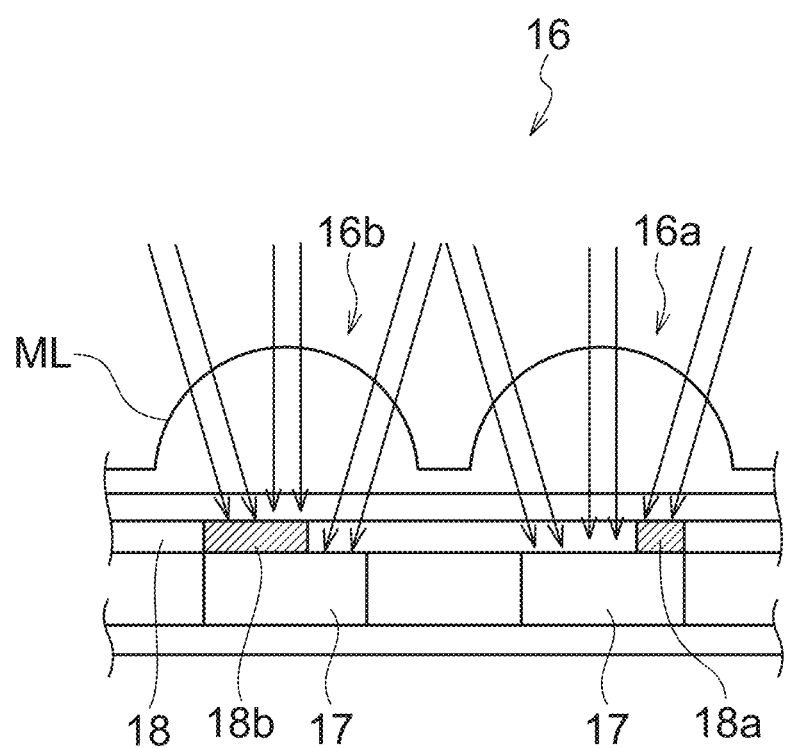
FIG. 7 is a diagram illustrating a configuration of a CCD 16.
Figure 13:
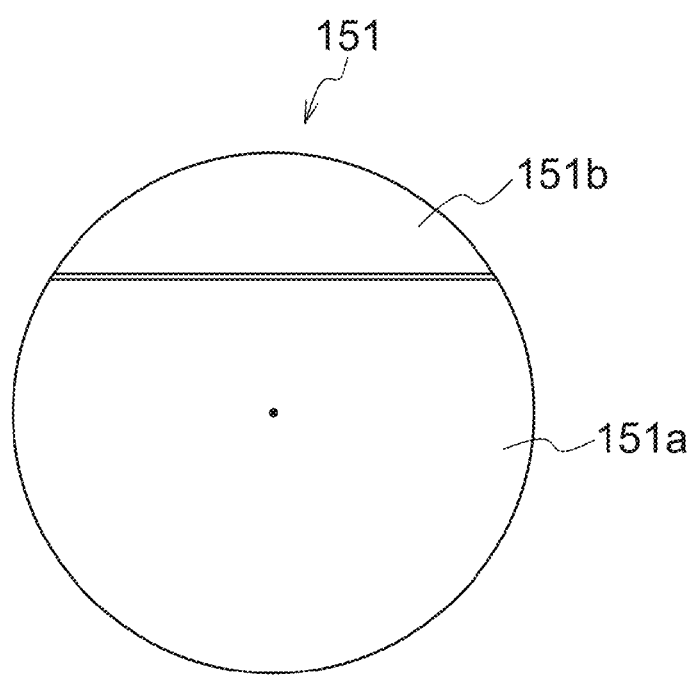
FIG. 13 is an elevation view illustrating an image capturing lens 151 in a distal end portion 144 of an endoscope 100.

On the distal end face of the distal end portion 144, an image capturing lens 151 for the observation optical system 150 is disposed. A CCD 180 is disposed in the back of the image capturing lens 151. Similarly to the image capturing lenses 12 according to the first and second embodiments, the image capturing lens 151 is a multifocal lens having a far focal region 151a and a near focal region 151b (see FIG. 13). Similarly to the CCD 16 illustrated in FIG. 7, the CCD 180 has a plurality of light receiving cells which selectively receive light beams having passed through the far focal region 151a or the near focal region 151b (light receiving cells for distant imagery; light receiving cells for close imagery).

An observation image taken via the mage capturing lens 151 is imaged on the light-receiving surface of the CCD 180 to be converted into an electric signal, and outputted to the endoscope processor 200 via a not shown signal cable to be converted into a video signal. Thereby, the observation image is displayed on the monitor device 500 connected to the endoscope processor 200.

Figure 14:
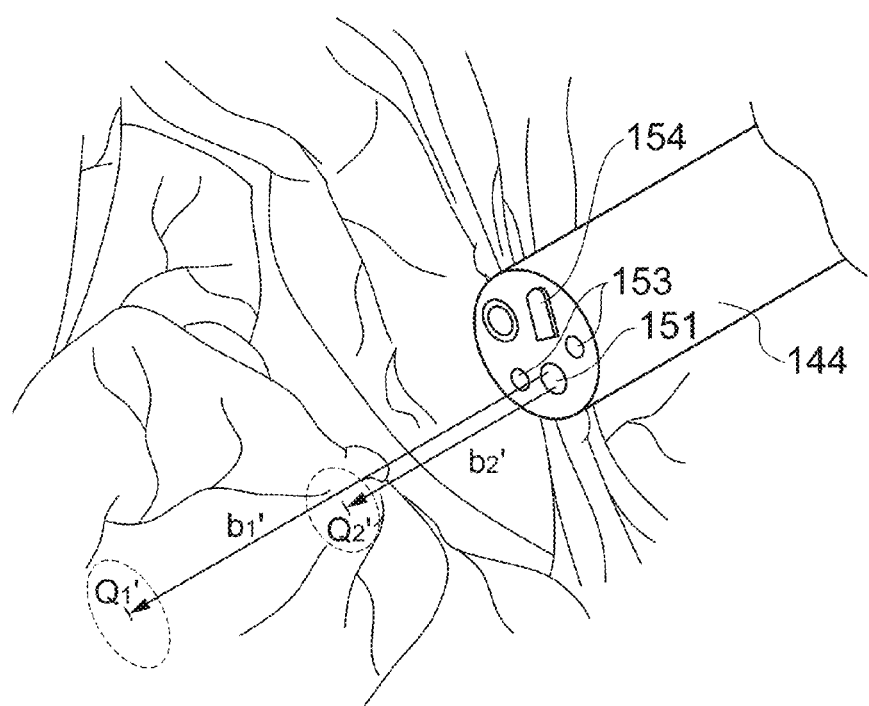
FIG. 14 is a diagram illustrating a state where the distal end portion 144 of the endoscope 100 is inserted in the body of a subject to be examined.

On the distal end face of the distal end portion 144, an illumination lens 153 of the illumination optical system 152 is provided adjacent to the image capturing lens 151. In the back of the illumination lens 153, the emitting end of a light guide 170 mentioned below is disposed. The light guide 170 is inserted through the insertion part 114, the hand operating part 112 and a universal cable 116. The incident end of the light guide 170 is disposed in an LG connector 120. Moreover, the light source device 300 is constituted of a light source 310, an aperture stop 330, a light collecting lens 340 and the like, and allows light for illumination to be incident onto the light guide 170. Succeedingly, the LG connector 120 is coupled with the light source device 300. Thereby, the illumination light applied from the light source device 300 is transmitted to the illumination lens 153 via the light guide 170 and applied to an observation region from the illumination lens 153. FIG. 14 is a diagram illustrating a state where the endoscope is inserted into the body of the person to be diagnosed. Herein, the in-focus distances of the far focal region 151a (aperture area $S_1'$) and the near focal region 151b (aperture area $S_2'$) of the image capturing lens 151 are $b_1'$ and $b_2'$. The subjects present at the in-focus distances (parts of the gastrointestinal walls of the person to be diagnosed) are $Q_1'$ and $Q_2'$.

In the image diagnosis apparatus 1000 having the above-mentioned configuration, when the light collecting powers and sensitivities of the light receiving elements for the individual regions of the image capturing lens are substantially equivalent to each other, the aperture area ratio of the far focal region and the near focal region of the image capturing lens 151 is set to meet the relationship represented by expression (1-9). When the light collecting powers and sensitivities of the light receiving elements for the individual regions of the image capturing lens are not even (in the case where the ratio is $m_{12}'$), similarly to the imaging apparatus 10 according to the second embodiment, the aperture area ratio of the far focal region and the near focal region of the image capturing lens 151 is set to meet the relationship represented by expressions (2-1) and (2-2). Thereby, when the images of the subjects $Q_1'$ and $Q_2'$ are simultaneously acquired via the far focal region 151a and the near focal region 151b, the brightness of the image of the subject $Q_1'$ at the in-focus distance $b_1'$ which image is imaged via the far focal region 151a, the brightness arising from the illumination light of the light source 310 can be configured to be substantially equal to the brightness of the image of the other subject $Q_2'$ at the in-focus distance $b_2'$ which image is captured via the near focal region 151b, the brightness arising from the illumination light of the light source 310.

Notably, in the third embodiment, $b_1'$ and $b_2'$ (also possibly $m_{12}'$) can be configured in accordance with the purpose of image capturing. When $b_1'$=5 cm, $b_2'$=0.5 cm, $m_{12}'$=0.15, for example, based on expression (1-9), $S_1'/S_2'=(5^2/0.5^2)\times 0.15=15$.

There is no light source except the illumination light applied from the illumination lens 153 in the body of the person to be diagnosed. Hence, an in-focus image at proper exposure can be stably obtained in the image diagnosis apparatus such as the endoscope 100 by allowing the aperture area ratio of the far focal region 151a and the near focal region 151b to meet the above-mentioned relationship. Thus, such application of the present invention is significantly effective.

[Other Embodiments]

The present invention can also be applied to various devices other than the imaging apparatuses and the image diagnosis apparatus according to the above-mentioned first to third embodiments. For example, in a monitoring system or an in-car camera system which has an infrared light source and acquires images in the infrared region, it can be considered that the image capturing lens employs a multifocal lens and that its aperture area ratio is allowed to meet the above-mentioned relationship. Also in such a system, similarly to the image diagnosis apparatus 1000 according to the third embodiment, the influence other than the infrared light that is applied from the infrared light source of the monitoring system is small. Thus, such application of the present invention is significantly effective.

As above, the present invention is described using the embodiments, and the technical scope of the present invention is not limited to the range set forth in the embodiments above. It is apparent to those who are skilled in the art that various modifications and alterations may occur with respect to the embodiments above. It is also apparent from the appended claims that the technical scope of the present invention may include the embodiments that undergo such modifications and alterations.

It should be noted that the implementing order of the processes such as the operations, steps, procedures and the like in the device, system, program and method presented in the claims, specification and drawings is not explicit specifically with "before", "prior to" or the like and that any order can apply to the implementation as long as the output of a previous process is not used for the succeeding process. Any operation flow in the claims, specification and drawings that is described using "first", "next" and the like for convenience sake does not mean necessity for implementation in such an order.

What is claimed is:

1. An imaging apparatus comprising:
a single multifocal lens having a plurality of regions, the plurality of regions having respective different focal distances;
a single imaging element in which a plurality of light receiving sensors corresponding to the respective plurality of regions are arranged in a two-dimensional arrangement;
an image processing device which acquires a plurality of images corresponding to light beams, respectively, each of which has passed through any of the plurality of regions having the respective different focal distances and been received by the plurality of light receiving sensors in response to one image capturing instruction, as respective individual images; and
an illumination light source that irradiates a subject with illumination light, wherein
each of the plurality of light receiving sensors selectively receives only the light beam that has passed through the corresponding region of the plurality of regions of the image capturing lens and does not receive the light beam that has passed through any other region except the corresponding region, regardless of a position in the two dimensional arrangement, and
an aperture area ratio between the plurality of regions is configured
such that, when the plurality of images are simultaneously acquired via the plurality of regions using the illumination light source and the image processing device,
brightness of the image of the subject at an in-focus distance of one region of the plurality of regions, the image imaged via the one region, the brightness arising from the illumination light,
is substantially equal to
brightness of the image of another subject at an in-focus distance of another region except the one region, the image captured via the other region, the brightness arising from the illumination light.

2. The imaging apparatus according to claim 1, wherein the aperture area ratio is configured such that an aperture area is wider in the region longer in in-focus distance.

3. The imaging apparatus according to claim 1, wherein the aperture area ratio is configured to satisfy the following expression:

{Expression 1}

$$\frac{S_i}{S_j} = \frac{b_i^2}{b_j^2} (i, j = 1 \sim N, i \neq j) \qquad (1)$$

where
N: The number of regions of the multifocal lens (integer of two or more)
$S_i$ and $S_j$: Aperture areas of regions i and j
$b_i$ and $b_j$: In-focus distances corresponding to the regions i and j.

4. The imaging apparatus according to claim 2, wherein the aperture area ratio is configured to satisfy the following expression:

{Expression 1}

$$\frac{S_i}{S_j} = \frac{b_i^2}{b_j^2} (i, j = 1 \sim N, i \neq j) \qquad (1)$$

where
N: The number of regions of the multifocal lens (integer of two or more)
$S_i$ and $S_j$: Aperture areas of regions i and j
$b_i$ and $b_j$: In-focus distances corresponding to the regions i and j.

5. The imaging apparatus according to claim 1, wherein the aperture area ratio is configured to satisfy the following expression:

{Expression 2}

$$\frac{S_i}{S_j} = m_{ij} \times \frac{b_i^2}{b_j^2} (i, j = 1 \sim N, i \neq j) \qquad (2)$$

where
N: The number of regions of the multifocal lens (integer of two or more)
$S_i$ and $S_j$: Aperture areas of regions i and j
$b_i$ and $b_j$: In-focus distances corresponding to the regions i and j
$m_{ij}$: Received light intensity ($l_i$) of the light receiving sensor corresponding to the region i/received light intensity ($l_j$) of the light receiving sensor corresponding to the region j.

6. The imaging apparatus according to claim 2, wherein the aperture area ratio is configured to satisfy the following expression:

{Expression 2}

$$\frac{S_i}{S_j} = m_{ij} \times \frac{b_i^2}{b_j^2} (i, j = 1 \sim N, i \neq j) \qquad (2)$$

where
N: The number of regions of the multifocal lens (integer of two or more)
$S_i$ and $S_j$: Aperture areas of regions i and j
$b_i$ and $b_j$: In-focus distances corresponding to the regions i and j
$m_{ij}$: Received light intensity ($l_i$) of the light receiving sensor corresponding to the region i/received light intensity ($l_j$) of the light receiving sensor corresponding to the region j.

7. The imaging apparatus according to claim 1, wherein the plurality of light receiving sensors are configured to satisfy the following expression:

{Expression 3}

$$\frac{P_i}{P_j} = \frac{S_i}{S_j} (i, j = 1 \sim N, i \neq j) \qquad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

8. The imaging apparatus according to claim 2, wherein the plurality of light receiving sensors are configured to satisfy the following expression:

{Expression 3}

$$\frac{P_i}{P_j} = \frac{S_i}{S_j} (i, j = 1 \sim N, i \neq j) \quad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

9. The imaging apparatus according to claim 3, wherein the plurality of light receiving sensors are configured to satisfy the following expression:

{Expression 3}

$$\frac{P_i}{P_j} = \frac{S_i}{S_j} (i, j = 1 \sim N, i \neq j) \quad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

10. The imaging apparatus according to claim 4, wherein the plurality of light receiving sensors are configured to satisfy the following expression:

{Expression 3}

$$\frac{P_i}{P_j} = \frac{S_i}{S_j} (i, j = 1 \sim N, i \neq j) \quad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

11. The imaging apparatus according to claim 5, wherein the plurality of light receiving sensors are configured to satisfy the following expression:

{Expression 3}

$$\frac{P_i}{P_j} = \frac{S_i}{S_j} (i, j = 1 \sim N, i \neq j) \quad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

12. The imaging apparatus according to claim 6, wherein the plurality of light receiving sensors are configured to satisfy the following expression:

{Expression 3}

$$\frac{P_i}{P_j} = \frac{S_i}{S_j} (i, j = 1 \sim N, i \neq j) \quad (3)$$

where
N: The number of regions of the multifocal lens
$P_i$ and $P_j$: The numbers of light receiving sensors corresponding to the regions i and j
$S_i$ and $S_j$: Aperture areas of the regions i and j.

13. The imaging apparatus according to claim 1, wherein the image processing device selects an image in which a designated subject is at proper exposure in focus out of the acquired plurality of images and outputs the selected image.

14. The imaging apparatus according to claim 2, wherein the image processing device selects an image in which a designated subject is at proper exposure in focus out of the acquired plurality of images and outputs the selected image.

15. The imaging apparatus according to claim 3, wherein the image processing device selects an image in which a designated subject is at proper exposure in focus out of the acquired plurality of images and outputs the selected image.

16. The imaging apparatus according to claim 4, wherein the image processing device selects an image in which a designated subject is at proper exposure in focus out of the acquired plurality of images and outputs the selected image.

17. The imaging apparatus according to claim 5, wherein the image processing device selects an image in which a designated subject is at proper exposure in focus out of the acquired plurality of images and outputs the selected image.

18. The imaging apparatus according to claim 6, wherein the image processing device selects an image in which a designated subject is at proper exposure in focus out of the acquired plurality of images and outputs the selected image.

19. The imaging apparatus according to claim 1, wherein the image processing device extracts a part in which the designated subject is at the proper exposure in focus from the acquired plurality of images and outputs an image having the extracted part combined.

20. The imaging apparatus according to claim 1, wherein each of the plurality of light receiving sensors includes a light shielding part that shields a light beam except the light beam having passed through the corresponding region.

* * * * *